(12) United States Patent
Duca et al.

(10) Patent No.: US 9,013,494 B2
(45) Date of Patent: *Apr. 21, 2015

(54) HEADS-UP-DISPLAY SOFTWARE DEVELOPMENT TOOL

(75) Inventors: Nathaniel G. Duca, Foster City, CA (US); Vlad Stamate, San Mateo, CA (US); Thomas Flynn, Sunnyvale, CA (US); Stace Peterson, San Jose, CA (US); Alexandre Depereyra, Sunnyvale, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 700 days.

This patent is subject to a terminal disclaimer.

(21) Appl. No.: 13/092,881

(22) Filed: Apr. 22, 2011

(65) Prior Publication Data

US 2012/0268470 A1    Oct. 25, 2012

Related U.S. Application Data

(63) Continuation of application No. 11/681,629, filed on Mar. 2, 2007, now Pat. No. 7,950,003.

(60) Provisional application No. 60/869,018, filed on Dec. 7, 2006.

(51) Int. Cl.
*G06T 15/00* (2011.01)
*G09G 5/36* (2006.01)
*G06T 11/20* (2006.01)

(52) U.S. Cl.
CPC .................... *G06T 11/206* (2013.01)

(58) Field of Classification Search
CPC ..... G06T 1/20; G06T 15/005; G06T 2210/52; G06T 11/206; G06T 1/60; G09G 5/363; G09G 5/393; G06F 3/14; G06F 2209/501; G06F 9/5044; G06F 11/3612; G06F 3/048; G06F 9/45516; G06F 11/3409; G06F 11/3419; G06F 2201/885; G06F 8/20; G06F 9/5066
USPC .................. 345/545, 522, 419, 629, 426, 589; 715/716; 717/124; 463/29
See application file for complete search history.

(56) References Cited

U.S. PATENT DOCUMENTS

| 5,287,490 A | 2/1994 | Sites |
| 5,317,740 A | 5/1994 | Sites |
| 5,327,568 A | 7/1994 | Maejima et al. |
| 5,862,381 A | 1/1999 | Advani et al. |
| 5,889,994 A | 3/1999 | Brown et al. |
| 5,909,580 A | 6/1999 | Crelier et al. |
| 6,047,123 A | 4/2000 | Brown et al. |
| 6,324,683 B1 | 11/2001 | Fuh et al. |
| 6,658,652 B1 | 12/2003 | Alexander et al. |

(Continued)

OTHER PUBLICATIONS

U.S. Appl. No. 60/869,018, entitled "Heads-up-Display Software Development tool", to Nathaniel G. Duca, filed Dec. 7, 2006.

(Continued)

*Primary Examiner* — Devona Faulk
*Assistant Examiner* — Nicole Gillespie
(74) *Attorney, Agent, or Firm* — Joshua D. Isenberg; JDI Patent (57) ABSTRACT

A method and apparatus for software development and a method and system for analysis of graphics software are disclosed.

26 Claims, 6 Drawing Sheets

(56) References Cited

U.S. PATENT DOCUMENTS

| | | | |
|---|---|---|---|
| 6,725,371 | B1 | 4/2004 | Verhoorn et al. |
| 7,463,259 | B1 * | 12/2008 | Kolb et al. .................... 345/426 |
| 7,533,371 | B1 * | 5/2009 | Johns et al. .................... 717/130 |
| 7,657,872 | B2 | 2/2010 | Kelbaugh et al. |
| 7,657,877 | B2 | 2/2010 | Vorbach et al. |
| 7,950,003 | B1 | 5/2011 | Duca et al. |
| 8,001,531 | B1 * | 8/2011 | Rideout et al. ................ 717/124 |
| 2007/0135216 | A1 * | 6/2007 | Martinek et al. ................ 463/29 |
| 2008/0141131 | A1 * | 6/2008 | Cerny et al. .................... 715/716 |
| 2010/0020069 | A1 * | 1/2010 | Elmieh et al. ................ 345/419 |
| 2012/0081377 | A1 * | 4/2012 | Sowerby et al. ............. 345/522 |

OTHER PUBLICATIONS

NVDIA Corporation of Santa Clara, California, RSX "Realty Synthesizer" Graphics Processing Unit download from http://en.wikipedia.org/wiki/RSX_%27Reality_Synthesizer%27.

Nathaniel G. Duca, "A Relational Debugging Engine for the Graphics Pipeline", in ACM Transactions on Graphics (TOG), vol. 24, Issue 3, (Jul. 2005).

Sony Computer Entertainment Incorporated, "Cell Broadband Engine Architecture", Version 1.0, Aug. 8, 2005.

U.S. Appl. No. 11/713,347, entitled "Graphics Command Management Tool and Methods for Analyzing Performance for Command Changes Before Application Modification", to Mark E, Cerny, Boris Batkin and Jonathan J. Olick, filed Mar. 2, 2007.

Siberstein et al, "Efficient computation of sum products on GPUS through software managed cache", ACM ICS, pp. 309-318, 2008.

Turner et al, "Strong performance gurantees for asynchronous buffered crossbar schedulers", IEEE, vol. 17, No. 4, pp. 1017-1028, 2008.

Stone et al, "High performance computation and interactive display of molecular orbitals on GPUs and multi-core CPUs", ACM GPGPU, pp. 1-10, 2009.

Yang et al, "Tolerating memory latency through push prefetching for pointer intensive applications", ACM Trans. on Arch. and Code Optimization, vol. 1, No. 4, pp. 445-475, 2004.

Office Action dated Sep. 13, 2010 for U.S. Appl. No. 11/681,629.

* cited by examiner

HEADS-UP-DISPLAY SOFTWARE DEVELOPMENT TOOL

CROSS-REFERENCE TO RELATED APPLICATION

This application is a continuation of commonly-assigned U.S. Non-Provisional patent application Ser. No. 11/681,629, to Nathaniel G. Duca, filed Mar. 2, 2007, and entitled "HEADS-UP DISPLAY SOFTWARE DEVELOPMENT TOOL", the entire disclosures of which are incorporated herein by reference, which claims the benefit of priority of commonly-assigned U.S. Provisional Patent Application 60/869,018, to Nathaniel G. Duca, filed Dec. 7, 2006 and entitled "HEADS-UP-DISPLAY SOFTWARE DEVELOPMENT TOOL", the entire disclosures of which are incorporated herein by reference.

FIELD OF THE INVENTION

This application is related to computer programming and more particularly to intuitive tools for analyzing and optimizing computer software.

BACKGROUND OF THE INVENTION

Computer graphics are an important part of many electronic devices and applications, such as video games. Computer graphics often requires both computer programming and artistic skills. Computer graphics is a complex process can be quite computationally intensive. The computational intensity may be measured in terms of the amount of computer processing time required to draw the objects within a computer-generated image. The amount of computer processing time can vary quite widely depending on the nature of the image. To optimize the use of available processing resources is often desirable to obtain real-time information on processor usage during computer rendering of graphical images.

It is within this context that embodiments of the invention arise.

SUMMARY OF THE INVENTION

According to an embodiment of the invention, a method for software development is disclosed. In the method a graphic display of information is presented as it is normally produced by a process implemented with computer software. An arbitrary range of objects with the graphic display is selected and one or more filters are applied to the processing of the objects in the arbitrary range. The processing of the objects is changed dynamically in response to the filters. A graph may be displayed showing utilization of computer processor resources for each object in the selected range with the one or more filters applied to the objects.

In addition, a graph may also be displayed showing utilization of computer processor resources for each object in the selected range without the one or more filters applied to processing the objects in the graph showing utilization of computer processor resources for each object in the selected range with the filtering applied to the objects. The graphic display of information and the graph may be displayed on the same screen in the form of a heads-up-display (HUD). The graph may be a bar graph having a plurality of bars, wherein each bar corresponds to a different object in the graphic display. A height of each bar may correspond to a measure of processing cost for drawing the corresponding object. Metadata associated with drawing a particular object may be displayed in the graphic display proximate the corresponding bar in the bar graph. The metadata may include a number of vertices and attributes of the particular object, time spent drawing the object, number of pixels that the object covers in the graphic display, or draw call timings. The draw call timings may include timings from different parts of a draw call pipeline such that the whole height of each bar is proportional with processor time spent to draw the particular object. Different colored parts of a bar corresponding to the particular object show processor time spent by different parts of a processor when drawing particular object. The metadata may be displayed by color coding objects in the graphic display according to different metadata.

According to another embodiment, the above method may be implemented using an apparatus for software development. The apparatus may comprise a display unit and one or more processors coupled to the display unit. The processors may be configured to execute processor executable instructions that cause the display unit to present a graphic display of information as it is normally produced by a process implemented with computer software running on the one or more processors. Additional instructions cause the apparatus to select an arbitrary range of objects within the graphic display and apply one or more filters to the processing of the objects in the arbitrary range. The instructions may cause the apparatus to change the processing of the objects dynamically in response to the filters.

According to another embodiment, a method for analysis of graphics software is disclosed. The graphics program places commands in a command buffer for a graphics processor unit (GPU). According to the method a program chunk is copied from the command buffer to a push buffer. The program chunk contains successive commands that are all of a common type. The program chunk is handled through command buffer and/or push buffer manipulation that is transparent to the graphics program. The program chunk is executed from the push buffer with the graphics processor.

The program chunk may be handled, e.g., by inserting a front command immediately before the program chunk in the push buffer, wherein the front command changes the operation of the program chunk in a way that facilitates analysis of the graphics program. A "get" may be moved to a point before a beginning of the front command in the push buffer. A back command may be inserted immediately after the program chunk. The back command may be configured to revert a configuration of the program to a configuration it would have had without the front command. A put in the push buffer may be moved to a point after an end of the back command.

Time stamps may be placed immediately before and after the program chunk. A time utilized by the graphics processor in executing the front and back commands may be determined using the time stamps and subtracting the time when computing timing of processing of the program chunk with the graphics processor. The time stamps may be used to determine a processing time on the graphics processor associated with handling of the program chunk so that the processing time can be subtracted out when computing timing of processing the program chunk with the graphics processor.

The program chunk may be executed by executing the front command, the program chunk and the back command from the push buffer with the graphics processor.

The front command and/or back command may implement a function on the program chunk. The function may facilitate analysis of the graphics program. By way of example, the function may be part of a vertex driver, shader debug driver, shader defrag disassembly driver filter or driver that asks for data that was in memory at a time of a draw call.

In some situations the function may requires information from a memory that is not yet available when the front or back command is put in the push buffer. In such a case, execution of the front command, program chunk or back command may be prevented until the information is available. The information may be imported to the function once the information becomes available. Execution of the front command, program chunk or back command may then be permitted.

In some cases, the program chunk may comprise one or more commands that set a state associated with a subsequent draw command. In such cases, the front command may modify the state from an initial value and the back command may revert the state to the initial value.

In some cases handling the program chunk may comprise applying one or more filters to the program chunk. Such filters may include a Simple Shader, a 1×1 Viewport, a Wireframe, a Register Count, a Disable Render, a Disable Blend, a Disable Alpha Test, a Reduce Geometry, a Depth Complexity, a Disable ZCULL, a 1×1 Textures and a Wait For Idle filter.

In some situations, the program chunk may be handled by saving frame data associated with a frame drawn by the GPU. Frame data may be saved e.g., by saving a set of commands associated with drawing a frame and saving an initial set of frame data for an initial draw call, and for subsequent draw calls, determining which, if any, portion of the frame data has been changed by the subsequent draw call. Those portions which have been changed by the subsequent draw call may then be saved. An initial hash function may be computed for each portion of the initial frame data. A subsequent hash function may be computed for one or more of the portions after the subsequent draw call. The initial and subsequent hash functions may then be compared to determine if a portion needs to be saved. In some cases, a given portion is saved only if it is estimated that the given portion has been used by the subsequent draw call.

In some situations, handling the program chunk may include implementing a shader debugger. The shader debugger may be implemented by inserting a shader debug sequence F(D) into the push buffer between a state chunk S and a draw call D, wherein the debug sequence includes placeholder D' for the draw call D, a state modifier portion that modifies the state from a state defined by the state chunk S, and a revert instruction REV that reverts state to that associated with the state chunk S. The placeholder D' may include a jump instruction JMP that causes the GPU to jump to a wait instruction that causes the GPU to wait until the draw call D has been copied to a memory location reserved for draw call D. The draw call D may be copied from the command buffer to the memory location reserved for the draw call D and either (a) copying the draw call D to the push buffer or (b) executing draw call D from the memory location with the GPU; revert command REV to revert a state and execute the draw call D again from the push buffer with the GPU. The state modifier portion may comprise a bind new shader instruction BNS, a bind surface instruction BS, a placeholder D' for the draw call D and wherein the revert command REV is configured to undo the BNS and BS commands According to another embodiment, a system for analysis of graphics software may comprise a central processing unit (CPU), a graphics processing (GPU) unit coupled to the CPU, a memory coupled to the GPU and CPU, the memory having therein a command buffer and a push buffer. A graphics program may be configured to run on the CPU. The graphics program places commands in the command buffer for a graphics processor unit (GPU). A graphics program analysis (HUD) program running on the CPU may include one or more instructions that implement the method for analysis software described above. The instructions may comprise one or more instructions that, when executed by the CPU, copy a program chunk from the command buffer to a push buffer and handle the program chunk through command buffer and/or push buffer manipulation that is transparent to the graphics program. The program chunk may be configured to be executed by the GPU from the push buffer.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

A number of different tools have been created to assist developers in analyzing computer graphics. Some of these tools used virtual column drivers in which filters would be used to change graphics processor unit (GPU) commands in the graphics software. Unfortunately, these tools are limited in their capabilities and somewhat awkward to use in that they did not provide intuitive feedback on how performance changed when the filters were applied. For example, MS PIX from Microsoft allows a user to pick a draw call (i.e., an object) within a computer graphic image and see information regarding the state of the processor that executes the draw call within a frame. Unfortunately, this application does not look at the structure of the frame. NVIDIA PERFHUD, by contrast provides a tool in the form of a heads-up-display (HUD) that is overlaid on a screen showing the frame being drawn. This application allows a user to obtain some information about the use of processing resources, e.g., by allowing the user to turn off all rendering for everything past a selected point and compare the processing usage with and without the rendering turned off. Another tool, known as gDEBugger, provides a similar capability, but does not allow a user to select an object or range of objects within the frame and analyzer the processor usage for these objects.

In a software development method according to an embodiment of the present invention, a graphic display of information is presented as it is normally produced by a process implemented with computer software. An arbitrary range of objects within the graphic display is selected and a graph is displayed showing utilization of computer processor resources for each object in the selected range. One or more software filters and/or drivers may be applied to the processing of the objects in the selected range. A graph may be displayed showing utilization of computer processor resources for each object in the selected range with the filters and/or drivers applied to the objects.

By way of example, an implementation of such a method as a software tool may be used to find graphics bugs and bottlenecks in graphic-intensive software applications such as video games. The tool may be distributed as a drop-in replacement graphics driver for a graphics API such DirectX® from Microsoft Corporation of Redmond, Wash. or open APIs such as OpenGL®ES, OpenGL® or related APIs for implementations of games running on a video game console. The user interface for the tool may be drawn on-top of the game as a "Heads-Up Display". Measurements and data may be updated immediately in response to user movements in the game. Such a tool may be implemented without major application changes to existing software development tools. DirectX® is a registered trademark of Microsoft Cooperation of Redmond, Wash. OpenGL® is a registered trademark of Silicon Graphics Cooperation of Mountain View, Calif.

Figure 1:
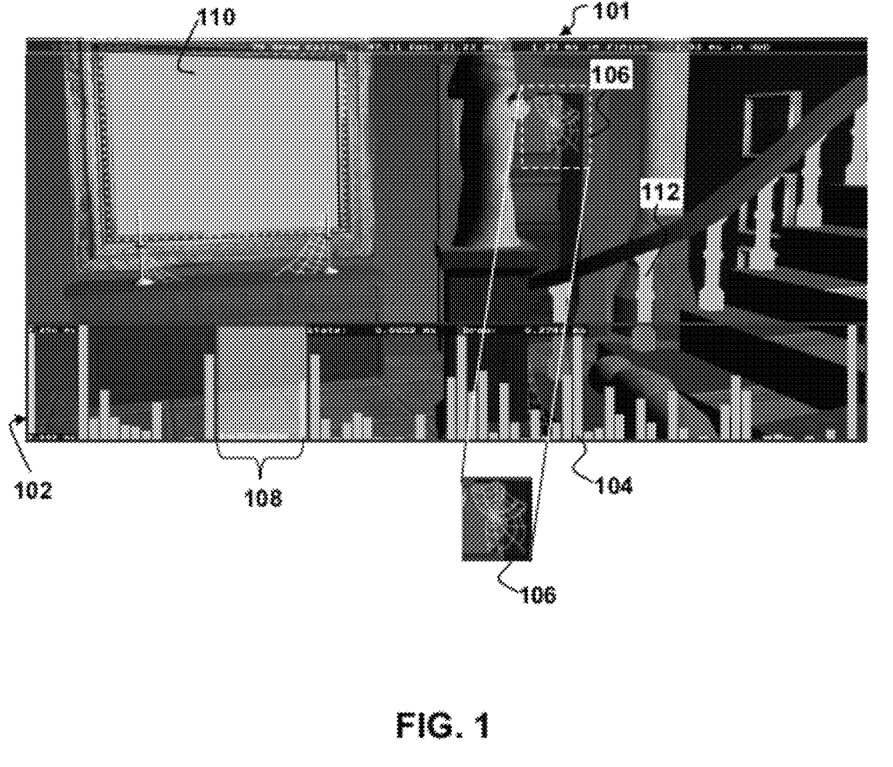
FIG. 1 is a screen shot illustrating use of a heads-up display software development tool according to an embodiment of the present invention.

By way of example, and without loss of generality, the graphic display and the graph may be displayed on the same screen, e.g., in the form of a heads-up-display (HUD), e.g., as shown in FIG. 1. In the HUD screen shot of FIG. 1, a bar graph 102 may be superposed over an image 101 generated by a computer graphics program. To facilitate analysis, the image 101 may be "frozen" on the screen with respect to time so that a developer can view the state of processing at a particular instant in time. By way of example, the image 101 may be a single frame from a sequence of such frames generated in response to instructions in a video game program. The video game program may involve other steps, e.g., player interactions, physics simulations and the like that determine the locations orientations and/or shapes of the objects being drawn by the computer graphics program. Each bar in the bar graph 102 corresponds to a different object in the frame 101. The heights of the bars in the bar graph 102 represent processing cost (e.g., processing time) for the corresponding object. As is shown in FIG. 1, the height of the bar 104 corresponding to the spider web 106 indicates that drawing the spider web 106 is very costly. By way of example, the HUD program may replace the texture for an object or range of objects with a 1×1 texture. For example, the range of objects 108 includes the mirror 110 and banister posts 112. As may be seen from the corresponding bars in the bar graph 102, the cost of drawing these objects is greatly reduced as a result. By comparing the cost of drawing the object with the regular texture and the 1×1 texture, a developer may determine to what extent the cost of drawing object depends on the texture being applied to the object.

It is noted that the graph in the HUD may display additional information. For example, the HUD may include other graphs that illustrate video and system memory allocation as filters and/or drivers are applied to different ranges of objects. The memory allocation information used to generate such a graph may be obtained, e.g., using malloc hooks. The memory allocation graph may be color coded to show allocation of memory for different drawing calls. In addition, the HUD may display aggregate information related to generation of the image shown on the screen. By way of example and without limitation, the HUD may display the time required to set up the state of the system to produce the frame and the total time spent drawing the objects in the frame. Examples of these values are shown just above the bar graph in FIG. 1. In addition, the HUD may also show the number of draw calls in the frame, the frame rate, the total amount of time spent finishing the frame and the amount of processor time spent by the HUD itself.

In embodiments of the present invention, the HUD may be configured in many different ways to make it more intuitive and easy to use. For example, the HUD could color code objects in the image according to their processing cost. Furthermore, the bar graph 102 may include metadata to show what each bar represents. Such metadata may include, but is not limited to, the number of vertices and attributes of the object, time spent drawing the object, number of pixels that the object covers on the screen, and draw call timings. The draw call timings may be timings from different parts of the draw call pipeline such that the whole height of each bar is proportional with the time spent by a graphics processing chip to draw that specific object, but different colored parts of that bar show the time spent by different parts of the RSX when drawing that object. In addition, the objects in the frame may be color coded according to different metadata.

Figure 2:
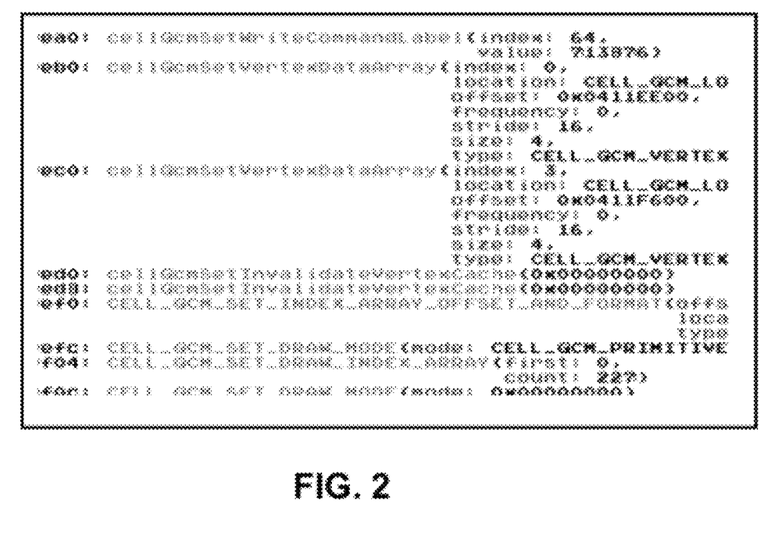
FIG. 2 is a screen shot illustrating display of code analysis for portions of code related to the drawing of the objects in a the selected range according to an embodiment of the present invention.

The HUD may provide different types of information to help a developer speed up a game under development. For example, as shown in the screen shot of FIG. 2, the HUD may display code analysis for portions of code related to the drawing of the objects in the selected range. Furthermore, as depicted in the screen shot of FIG. 3, the developer may selectively apply filters and/or drivers to an arbitrary range of drawn objects, thereby modifying the scene on the fly to isolate problems. This allows a developer to examine currently-executing code for redundancy and/or bugs. In addition, as shown in the screen shot of FIG. 4, the HUD may shown signal analysis that helps the developer find software bottlenecks by studying hardware performance counters associated with drawing objects in the selected range.

Figure 5A:
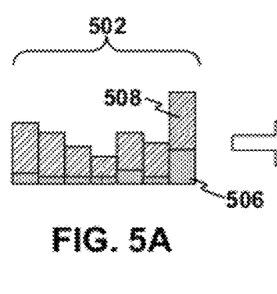
FIGS. 5A-5C are a sequence of partial screen shots depicting an example of selecting and applying software filters and/or drivers to a selected range of objects according to an embodiment of the present invention.
Figure 5B:
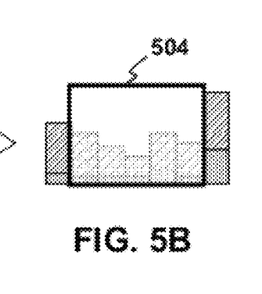
Figure 5C:
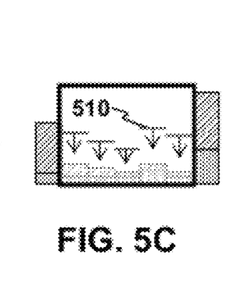

A scene is rendered by submitting draw calls with same attributes to a graphics processing chip, such as the RSX "Reality Synthesizer" graphics processing unit from NVIDIA Corporation of Santa Clara, Calif. Details of the RSX are described, e.g., at the Wikipedia entry for RSX "Realty Synthesizer" Graphics Processing Unit, the disclosures of which are incorporated herein by reference. The RSX Graphics processing unit is a graphics chip design co-developed by NVIDIA and Sony for the PlayStation 3 computer console. As illustrated in FIG. 1 and FIGS. 5A-5C. Each draw call for each object in the frame is shown on a column bar graph 502 in processed order with each column in the bar graph corresponding to a different object in the frame. The height of each column in the bar graph 502 indicates cost of the draw call, e.g., in terms of processing time. A filter feature allows a user to test out an optimization before implementing it, as illustrated in FIGS. 5B-5C. Specifically, as shown in FIG. 5B, the user selects a part of the scene to be changed by selecting specific objects corresponding to a range 504 of bars in the bar graph. The range of selected objects may be quire arbitrary. By way of example, the range 504 may cover all objects between and including a first and last object in the range. In some implementations the range of objects may be discontinuous and need not include all objects between the first and last object. One or more filters are then applied to the objects in the selected range. For example, a "Reduced Texture Resolution" filter may be applied to all selected objects. If enabling the filter changes performance, the optimization will speed up the game.

For example, in the screen shot of FIG. 1, the texturing has been turned off for selected objects in the frame including the picture in the background and the banister supports. The change in height of the bars corresponding to these objects when the filtering is applied (or lack thereof) gives the developer a direct indication of the relative computational cost of texturing these objects.

It is noted that the individual bar graphs may be divided up to show different information, for example one portion 506 of each column in the bar graph 504 may show the part of the processor time dedicated to system setup for a draw call and another portion 508 (indicated, e.g., by a different color) may be indicate that portion of the processor time dedicated to the draw call itself. In additional embodiments of the invention such a color coding scheme may be used to further break down the processing time within the draw call, e.g., indicating time spent on rendering pixels, texturing, and the like. In addition the bar graph 502 may be configured to facilitate comparing the computational cost of drawing selected objects with and without applying the filter. For example, as shown in FIG. 5C, the bar graph may include "falling peaks", e.g., markers 510 indicating the bar height with the filter that remain after the filter has been applied. In this way, a developer may quickly compare the cost of drawing the selected objects with and without the filtering by viewing the bar graph without having to "toggle" the filtering on and off.

By way of example, and without loss of generality, objects may be selected and filters may be applied to selected draw commands in software, e.g., using so-called "when" expressions. For example, to select objects 15-25 and drop the textures from these objects, an expression of the type "drop textures when object=15-25". The use of when expressions in the context of graphics software debugging is discussed, e.g., by N. Duca in "A Relational Debugging Engine for the Graphics Pipeline", in *ACM Transactions on Graphics (TOG)* Volume 24, Issue 3 (July 2005), Proceedings of ACM SIGGRAPH 2005, which is incorporated herein by reference for all purposes.

As used herein, the distinction between a driver and a filter is as follows. A filter affects the appearance of displayed graphics and a driver obtains information about performance of the graphics processing without necessarily affecting the appearance of displayed graphics. By way of example, a filter may change a texture for one or more objects while displaying the bar graph of FIG. 5A-5C. A driver, by contrast may simply disassemble a command or group of commands, e.g., by converting the command to a string value, disassembling the string and put out the result to a user interface.

Figure 3:
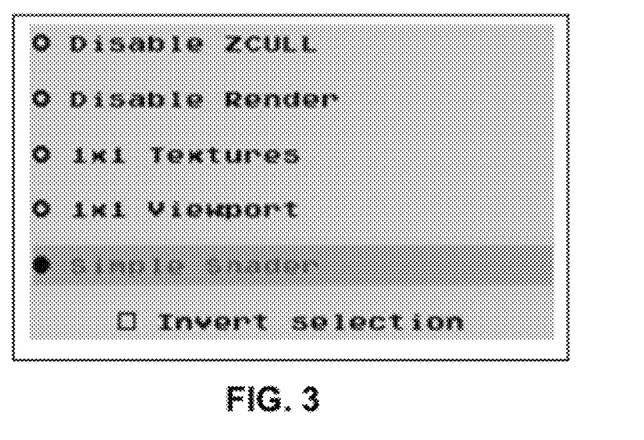
FIG. 3 is a screen shot illustrating a drop-down menu for applying filters and/or drivers to the drawing of the objects in a the selected range according to an embodiment of the present invention.
Figure 4:
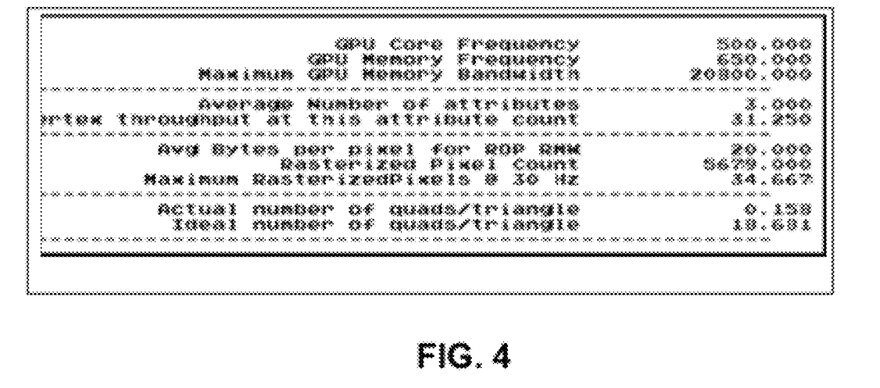
FIG. 4 is a screen shot illustrating signal analysis intended to help a developer find software bottlenecks by studying hardware performance counters associated with drawing objects in the selected range according to an embodiment of the present invention.

Filters and/or drivers may be applied to the selected objects by selecting the appropriate filter from a menu, e.g., as shown in FIG. 3. Examples of filters which may be applied to the selected objects include, but are not limited to, those listed in Table I below.

TABLE I

| Filter Name | Filter Description |
| --- | --- |
| Simple Shader | Draw calls are rendered with a very simple shader. Can show texture fetch or shader execution bottlenecks. |
| 1×1 Viewport | Draw calls are rendered using a 1×1 viewport. |
| 1×1 Textures | All textures set up by the application will have size of 1×1. |
| Wireframe | Shows the selected objects in wireframe mode. |
| Disable Render | Replaces all GCM draw commands with No Operation Commands (NOPs). This is typically done at the hardware level and does not touch the command buffer. By disabling render of one or more objects a developer can gain insight into the processing cost of rendering the objects. |
| Disable ZCULL | Disables Z-Cull on the current scene. When an object is rendered by a 3D graphics card, the depth (z coordinate) of a generated pixel is stored in a buffer (the z-buffer or depth buffer). This buffer is usually arranged as a two-dimensional array (x-y) with one element for each screen pixel. If another object of the scene must be rendered in the same pixel, the graphics card compares the two depths and chooses the one closer to the observer. The chosen depth is then saved to the z-buffer, replacing the old one. In the end, the z-buffer will allow the graphics card to correctly reproduce the usual depth perception: a close object hides a farther one. This process is referred to as z-culling. |
| Disable Alpha Test | Disables the Alpha Test raster operation when the selected objects are drawn. |
| Disable Blend | Disables the Blend raster operation when the selected objects are drawn |
| Wait For Idle | Waits for the RSX to become idle after every draw call before submitting the next draw call. Such a filter may be useful, e.g., as a way to turn of the pipelining of draw commands. In this manner a developer may gain insight into whether pipelining of the draw commands is optimized. |
| Depth Complexity | Colors the selected objects with an encoded color scheme to show the amount of overdraw. |
| Reduce Geometry | Reduces the number of indices each draw call draws. |
| Register Count | Changes the number of registers the fragment shader is using |

Although examples are described in terms of computer graphics applications, those of skill in the art will recognize that embodiments of the invention may be applied to other types of software development. For example, in developing software for multi-processor systems, such as the Cell processor, it may be useful to graphically represent and manipulate the jobs being performed by a given processor within the system as shown in FIGS. 5A-5C. For example, in a Cell processor having a Power Processing Unit (PPU) and several Synergistic Processing Units (SPUs), the HUD may display a plurality of bar graphs with each graph showing the processor time for jobs being handled by a different processor (PPU or SPU) within the system. A user may apply filters and/or drivers to selected ranges of jobs to determine the effect of the filters on performance.

In embodiments of the present invention a HUD system and method may operate by emulating a front end of a graphics processor unit (GPU) such as the RSX through manipulation of GPU commands in a command buffer in a way that is transparent to the application that generated the commands. In alternative embodiments, a HUD system and method may operate by manipulating commands in a GPU command buffer in the absence of the application that generated the commands. In such embodiments, a software development tool may capture all the commands that are sent to the GPU in the course of execution of a portion of a graphics program so that these commands may be played back later in the way a graphics application generated the commands. Examples of such embodiments are described e.g., in commonly assigned U.S. patent application Ser. No. 11/713,347, to Mark E. Cerny, Boris Batkin and Jonathan J. Olick, entitled "GRAPHICS COMMAND MANAGEMENT TOOL AND METHODS FOR ANALYZING PERFORMANCE FOR COMMAND CHANGES BEFORE APPLICATION MODIFICATION" and filed on the same day as the present application, the entire disclosures of which are incorporated herein by reference.

Figures 6A, 6B:
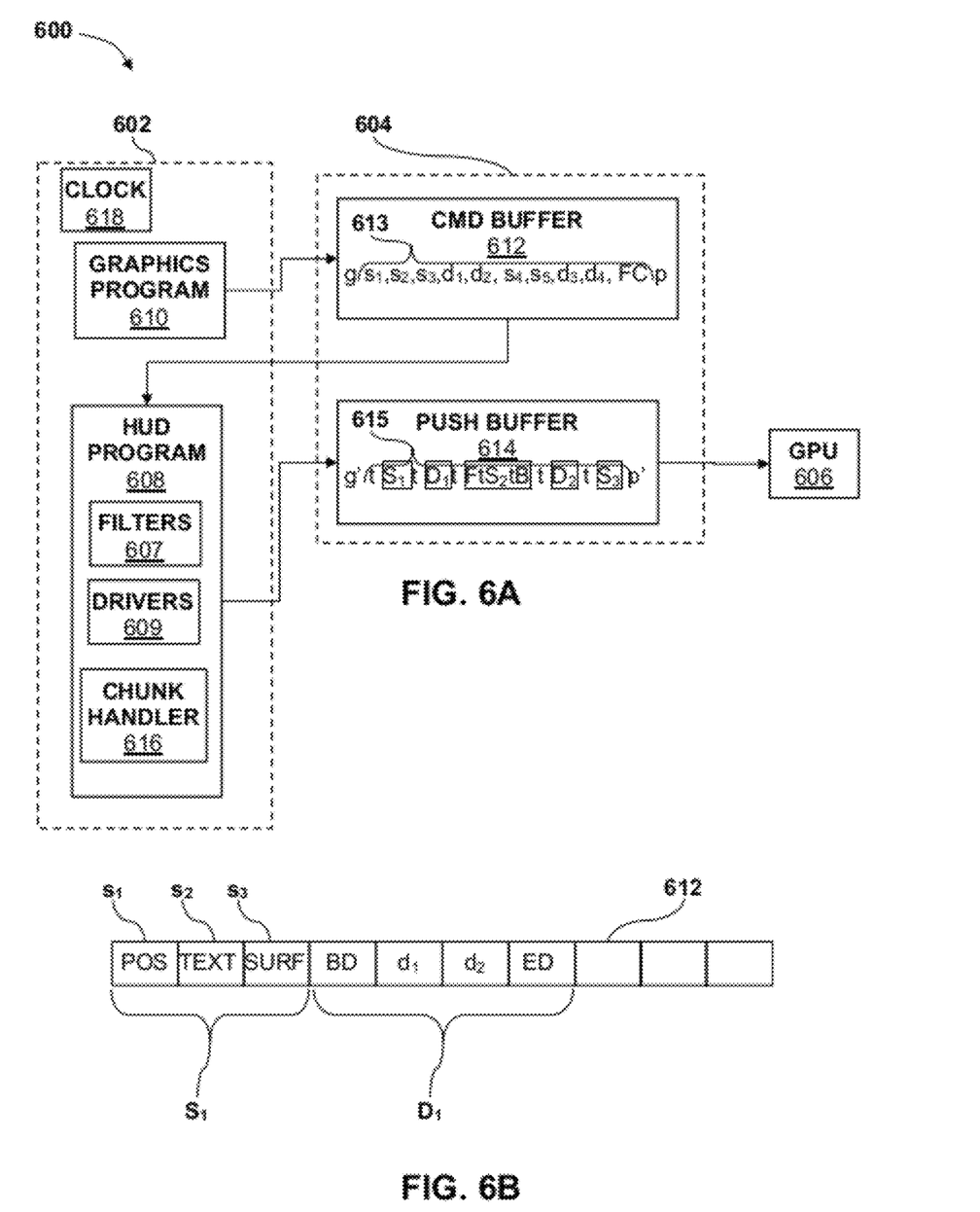
FIGS. 6A-6D are schematic diagrams illustrating a method and system for analysis of graphics software according to an embodiment of the present invention.

FIGS. 6A-6D schematically illustrate a preferred implementation of a method and system for analysis of graphics software development that uses a HUD of the type described above. As shown in FIG. 6A, a, graphics software analysis system 600 may comprise a central processor unit (CPU) 602, a memory 604 and a graphics processor unit (GPU) 606. The memory 604 may be shared between the CPU 602 and GPU 604. Alternatively, the CPU and GPU may each have separate local memories. By way of example, the CPU may be a 64-bit PowerPC Processor Units (PPU). The CPU 602 may be a parallel processor or may be part of a parallel processor, such as a cell processor. Cell processors are described in detail, e.g., in *Cell Broadband Engine Architecture*, copyright International Business Machines Corporation, Sony Computer Entertainment Incorporated, Toshiba Corporation Aug. 8, 2005, the entire contents of which are incorporated herein by reference. The CPU 602 executes a HUD program 608 and a graphics program 610. By way of example, the HUD program 608 and graphics program 610 may be implemented as threads running on the CPU 602. A "thread" generally refers to a part of a program that can execute independently of other parts. Operating systems that support multithreading enable programmers to design programs whose threaded parts can execute concurrently. The graphics program 610 may be a portion of another larger program, such as a game program. In the absence of the HUD program 608, the graphics program 610 would ordinarily operate on data from a memory 604 and generate commands that are sent to a graphics processor unit (GPU) 606. According to an embodiment of the invention, the HUD program 608 intercepts commands generated by the graphics program 610 and applies filters or drivers to those commands before sending the modified commands to the GPU 606. The filters or drivers may be configured as described above with respect to Table I. Alternatively, the HUD program 608 may be run, e.g., as a thread, on a separate processor that can operate in parallel with the CPU 602.

The HUD program 608 may implement a method for analysis of the graphics software such as the graphics program 610, wherein the graphics program places commands in a command buffer 612 for the GPU 606. The method involves copying a program chunk from the command buffer 612 to a push buffer 614. The program chunk contains successive commands that are all of a common type. The program chunk is handled through command buffer and/or push buffer manipulation that is transparent to the graphics program 610. The program chunk is executed from the push buffer 614 with the GPU 606.

The graphics program 610 may generate geometry that can be rendered by the GPU 606. The graphics program 610 may generate simplified commands 613, sometimes referred to as micro-commands, and temporarily stores them in a command buffer 612 in the memory 604. In the absence of the HUD program 608, the commands 613 would be transferred directly to the GPU 606 for execution. Once the GPU 606 is finished executing the commands they may be removed from the command buffer 612. A program counter referred to as a "get" g marks the instruction that the GPU is currently executing. Another counter, referred to as a "put" p marks the latest instruction to be put in the buffer. The "put" may be though of is a marker in the command buffer that marks the point in the command buffer where commands have been put into the buffer by the HUD. The graphics program 610 puts instructions into the command buffer after the put p and the GPU consumes the instructions from the get g. After an instruction has been placed into the command buffer the put is advanced to the end of that instruction. Once an instruction has been consumed by the GPU 606 the get g advances to the beginning of the next instruction. If the get g and the put p are at the same location in the buffer, the graphics processor halts until the put p is advanced to some point in the command buffer that is in the future relative to the get g. In embodiments of the present invention, the HUD program 608 may emulate a front-end of the GPU 606 through grouping of similar commands into chunks and manipulation of the put p and the get p.

The HUD program 608 may implement various filters 607 and/or drivers 609 that operate on portions of the graphics program 610. To do this, the HUD program 608 copies commands 613 (or groups of commands) from the command buffer 612 and places them in the push buffer 614. By way of example, the push buffer 614 may be a first-in first-out (FIFO) buffer. The push buffer 614 emulates a front end of the GPU 606. The HUD program 608 can then modify the commands (or groups of commands) before sending them to the GPU 606 for execution. By way of example, the filters 607 and drivers 609 may apply some function to selected commands or groups of commands generated by the graphics program 610, thereby producing the modified commands 615.

In a preferred embodiment of the present invention, the HUD program 608 operates through command buffer manipulation that is transparent to the application that generated the commands. To facilitate manipulation of commands in the command buffer in a way that is transparent to the graphics program 610, the HUD program 608 may handle commands from the program buffer in groups referred to as program chunks. As used herein, a program chunk refers to a sequence of program commands of the same type. By way of example, the graphics program commands 613 may be divided into three types: State, Draw and Flow control. State commands and draw commands may be grouped together as chunks. Flow control commands may simply be processed as normal. State commands relate to variables associated with objects that are to be drawn. Such variables include, e.g., the position of an object to be drawn, the number of objects to be drawn, the surface of the object that is to be drawn, a texture to be applied to the surface of the object. State commands may also include transformation programs, programmable fragment shaders, raster operations and the like.

Draw commands, are commands directed to drawing the object. By way of example, a draw command may specify the geometry of an object to be drawn and contain a list of vertices from which that object is being formed. Flow control includes e.g., jump and return commands, synchronization primitives, and the like. Flow control commands may include commands that call into a separate buffer. That buffer may have a return command at the end.

A sequence of graphics program commands 613 of the same type is referred to herein as a chunk. As the HUD program copies a command from the command buffer to the push buffer it checks the type of command. When the HUD program 608 detects a change from one type of command to another, it recognizes the sequence of commands since end of the last chunk as a new chunk and initiates a chunk handler 616. If there are no HUD algorithms to be implemented for a chunk, the chunk handler 616 may just copy the commands that make up the chunk in the command buffer 612 to the push buffer 614. The HUD program 608 may also place a time stamp t before or after the chunk $S_1$. If a HUD filter or driver is to be implemented, however, the HUD program 608 may insert additional commands before and after the chunk that implement the filter or driver.

Transitions from one command type to another may be used to mark the boundaries of the program chunks. When the HUD detects a change from one command type to another, it initiates a chunk handler that processes the commands that make up the chunk. For example, suppose HUD finds three state commands $s_1, s_2, s_3$ followed by two draw commands $d_1, d_2$. By way of example, $s_1$ may set the position of an object, $s_2$ may set the texture to be applied to a surface of the object and $s_3$ may define the surface of the object as shown in FIG. 6B. In addition, a begin draw command BD and an end draw command ED by included with draw commands $d_1, d_2$.

The transition from the last state command $s_3$ to the first draw command $s_1$ triggers a call to the chunk handler. The chunk handler 616 groups the three state commands $s_1, s_2, s_3$ together as a chunk $S_1$. The chunk handler 616 may then copy the chunk $S_1$ from the command buffer to a push buffer. If the chunk $S_1$ is to remain unmodified the chunk $S_1$ may just be passed to the GPU 606 from the push buffer 614 without further modification. The chunk handler may similarly group draw commands $d_1$ and $d_2$ into chunk $D_1$. State commands $s_4, s_5$ and draw commands $d_3, d_4$ may similarly be grouped into chunks $S_3$ and $D_2$. The HUD program 608 recognizes flow control command FC as a being of a different type than draw command $d_4$.

The chunk handler may simply copy the flow control command FC from the command buffer 612 to the push buffer 614 without further modification.

After a chunk or flow control command has been copied from the command buffer 612 to the push buffer 614, the HUD program can move the get g in the command buffer to a point immediately before the next chunk in the command buffer 612. Any commands in the command buffer that come before the get g may then be overwritten and new commands may be added to the back end of the command buffer 612. The get g in the command buffer 612 is in a sense "fake" in that it does not indicate which command is being currently consumed by the GPU 606. Instead it indicates the point up two which commands have been moved to the push buffer 614. In a similar sense the put p is "fake" in that it does not indicate the last command in the command buffer 612 for consumption by the GPU 606. Instead it indicates the last command placed in the command buffer 612 for processing by the HUD program 608.

The chunk handler 616 manipulates a get g' and a put p' in the push buffer 614. The get g' and put p' are "real" in the sense that they respectively indicate the current command being consumed by the GPU 606 and the last command in line for consumption by the GPU. After the chunk handler 616 has finished handling a chunk in the push buffer 614 the put p' may be moved to a point immediately after the chunk. After the GPU 606 has consumed a chunk in the push buffer 614 the get g' may be moved to a point immediately after the chunk.

If the HUD program 608 is to implement a filter or driver, the chunk handler 616 may be configured to rewrite program chunks on the fly. If a command needs to be changed, the chunk handler 616 can drop in a front command F before the chunk and then subsequently drop in a back command after the chunk that reverts the change. By way of example, the chunk handler 616 may insert front and back commands F, B before and after chunk $S_2$. For example, the state commands $s_4$ and $s_5$ may set a position and texture for a particular object that is to be drawn by the GPU 606. The front command F may set the texture to a simple 1×1 texture. To prevent this change from affecting other objects, the back command F may re-set the texture to whatever value it would have had in the absence of the front command. In this way, the commands that make up the chunk $S_2$ remain unchanged and any changes to one chunk are not carried over to other chunks. The HUD program 608 may track the state of the GPU 606 so that it knows, e.g., when it sees a position, texture or other value in a state command there is a tracked history of what that value was before.

In some cases, the chunk handler 616 may insert a timestamp t in the push buffer immediately before and/or after a copied chunk. The time stamps t allow the HUD program 608 to subtract out any GPU time taken up by execution of the modified chunks so that timing calculations in the HUD's analysis of the graphics program 610 are not otherwise affected by the commands F, B inserted at the front and back of the program chunk $S_2$. For example, if the HUD program 608 may apply a filter that implements a bar graph of the type shown in FIG. 1 and/or FIG. 5A-5C that displays the processing cost (e.g., in GPU processor time) of the draw calls associated with each object. It is desirable that the cost of such draw calls not be contaminated by processing time associated with the filter applied by the HUD program 608. Through use of the time stamps t, the cost of the front command F and back command B may be subtracted out from computation of the cost of the draw calls in the chunk $D_2$.

By way of example a time stamp operation may take current time value from a CPU clock 618 and put it into one of a plurality of reserved address. By way of example, there may be of order 2000 addresses reserved in memory 604 for time stamps. The unmodified commands in a chunk may be tracked separately using separate time stamps with a gap between them into which the HUD program 608 may insert commands. This keeps the HUD program's overhead out of the graphics program 610 and allows the graphics program 610 to run in real time.

Figure 6C:
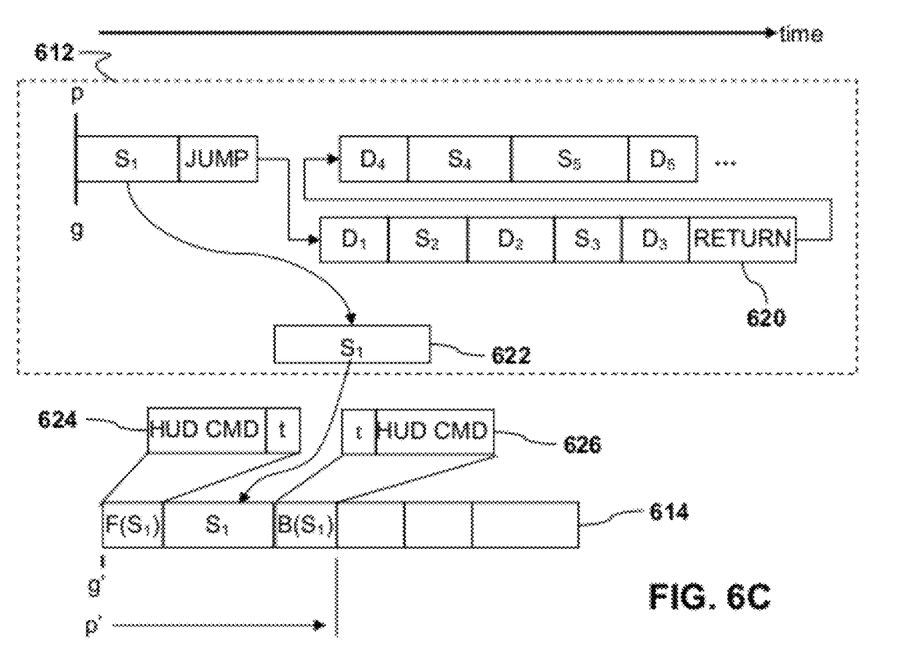

FIGS. 6C-6D illustrate an example of operation of the system and method. Specifically, as shown in FIG. 6C at a certain point operation, the command buffer may contain GPU state commands that may be broken down into chunks designated $S_1$, $S_4$ and $S_5$ and draw commands that may be broken down into chunks designated $D_4$ and $D_5$. The command buffer 612 may also contain a flow control command in the form of a jump to some other location 620 in memory 604 that contains additional draw commands that make up chunks $D_1$, $D_2$ and $D_3$, state commands that make up chunks $S_2$ and $S_3$ and a return command. These latter commands in location 620 may be regarded as being in the command buffer 612 for the purposes of embodiments of the present invention. In this example, the put p and the get g are initially located immediately before chunk $S_1$. This prevents chunk $S_1$ from being overwritten until the HUD program 608 moves the put p to someplace after chunk $S_1$. The chunk handler 616 may utilize three temporary buffers 622, 624 and 626 when handling chunks from the command buffer 612. For example the chunk handler may copy chunk $S_1$ to temporary buffer 622 so that HUD algorithms (e.g., filters and/or drivers) may read chunk $S_1$ and perform any necessary computations based on chunk $S_1$ or its source code. The HUD program 608 may temporarily store HUD commands and a time stamp t that make up a front command $F(S_1)$ that operates on chunk $S_1$ in temporary buffer 624. The HUD program 608 may also temporarily store HUD commands and a time stamp t that make up a back command $B(S_1)$ that operates on chunk $S_1$ in temporary buffer 626.

Figure 6D:
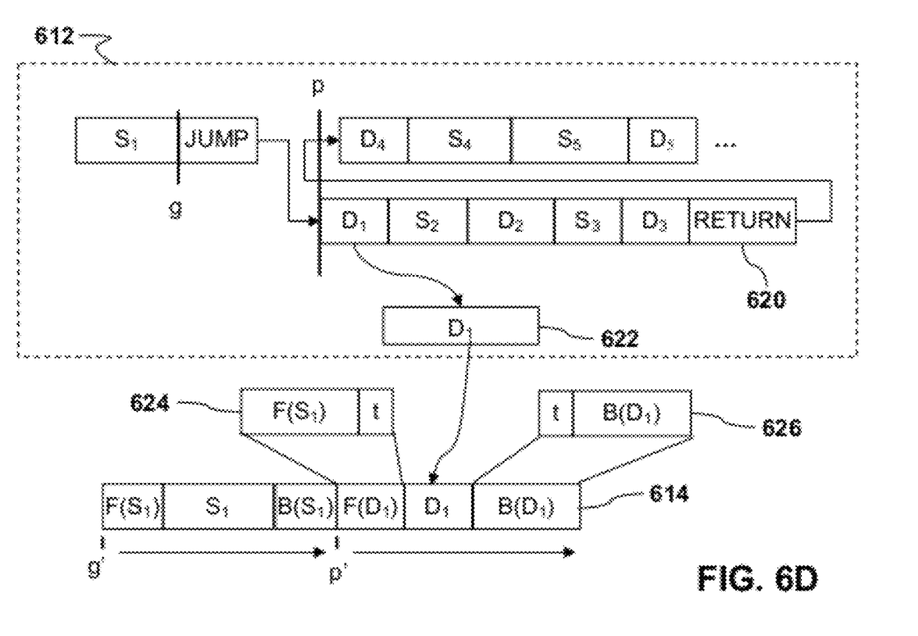

The chunk handler 616 may copy the front command $F(S_1)$, chunk $S_1$ and back command $B(S_1)$ from the temporary buffers 622, 624 and 626 respectively to the push buffer 614 in that order. In this example, the put p' and get g' in the push buffer 614 are initially at the front of the push buffer, i.e., ahead of the front command $F(S_1)$. This effectively halts the GPU 606 until the chunk handler moves the put p'. After the back command $B(S_1)$ has been copied to the push buffer 614, the chunk handler 616 moves the put p' to the back of the back command $B(S_1)$. The GPU is then free to consume the front command $F(S_1)$, the chunk $S_1$ and the back command $B(S_1)$. The chunk handler 616 may also move the put p and the get g in the command buffer 612 so that the HUD can handle the next command. Once the GPU 606 has consumed $F(S_1)$, $S_1$ and $B(S_1)$ the get g' may be moved to a point immediately after the back command $B(S_1)$ as shown in FIG. 6D.

In this example, the next command in the command buffer 612 is a jump to memory location 620. The chunk handler 616 may follow the jump command to location 620 and handle the commands located there as it would if they were in the command buffer 612. Specifically, the chunk handler 616 may copy chunk $D_1$ to temporary buffer 622, as shown in FIG. 6D so that the HUD program 608 may read it. The HUD program 608 may write new front and back commands $F(D_1)$, $B(D_1)$ to the temporary buffers 624, 626, respectively. The chunk handler 616 may then write the front command $F(D_1)$ after the put p', the chunk $D_1$ after the front command $F(D_1)$ and the back command $B(D_1)$ after the chunk $D_1$.

The HUD program 608 may repeat the preceding operations for chunks $S_2$, $D_2$, $S_3$ and $D_3$ at location 620. The HUD program 608 may then follow a return command and resume handling of the chunks in the command buffer 612, starting with chunk $D_4$.

Figure 6E:
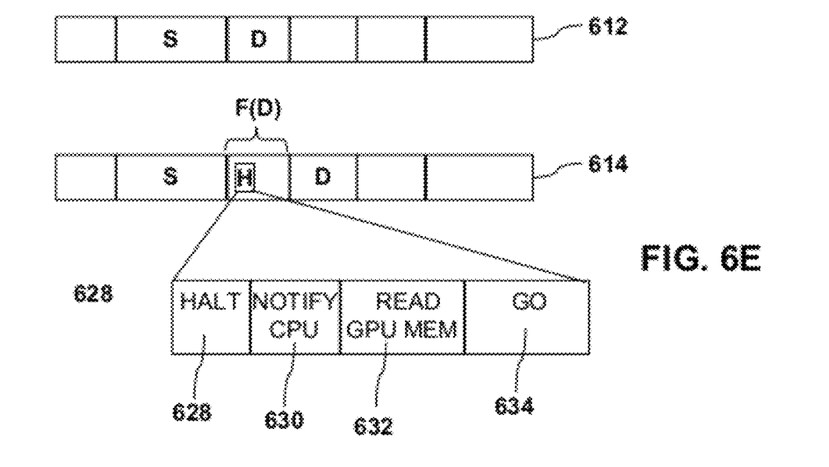
FIG. 6E illustrates an example of use of a "hole" according to an embodiment of the present invention.

In some embodiments the HUD program 608 may optionally insert a "hole" between commands within a chunk. As used herein, a hole refers to a placeholder for information (e.g., code or data) that is to be generated at some future time. The hole may be implemented by a synchronization primitive that prevents execution of a chunk until the additional information has been generated and provided to a front or back command that requires the missing information. By way of example, the HUD program 608 may sample a vertex driver to see what geometry the GPU 606 is using for a particular draw call. To implement this, the vertex driver may copy the draw call and analyze it to see what was drawn. To analyze the draw call, the vertex driver may need to access the GPU memory to obtain the geometry data that the GPU used to execute the draw call. As shown in FIG. 6E, the vertex driver may put a hole H e.g., in a front command $F(D)$ before a draw chunk D in the push buffer 614. The hole H may include an instruction 628 that directs the GPU 606 to halt. The hole H may include another instruction 630 (e.g., a write memory instruction) that notifies the CPU 602 that GPU 606 is at the draw call to be analyzed. The hole H may contain yet another instruction 632 that directs the CPU 602 to read the GPU memory and pull back all geometry the GPU 606 is using for the draw call and a final instruction 634 that lets the draw call D go ahead. By way of example the halt 628 instruction may be in the form of a "wait until" instruction that halts the GPU until the CPU 602 has read back the GPU memory. This allows the HUD program 608 to read back the geometry used in the draw call and determine what the user had intended.

Figure 6F:
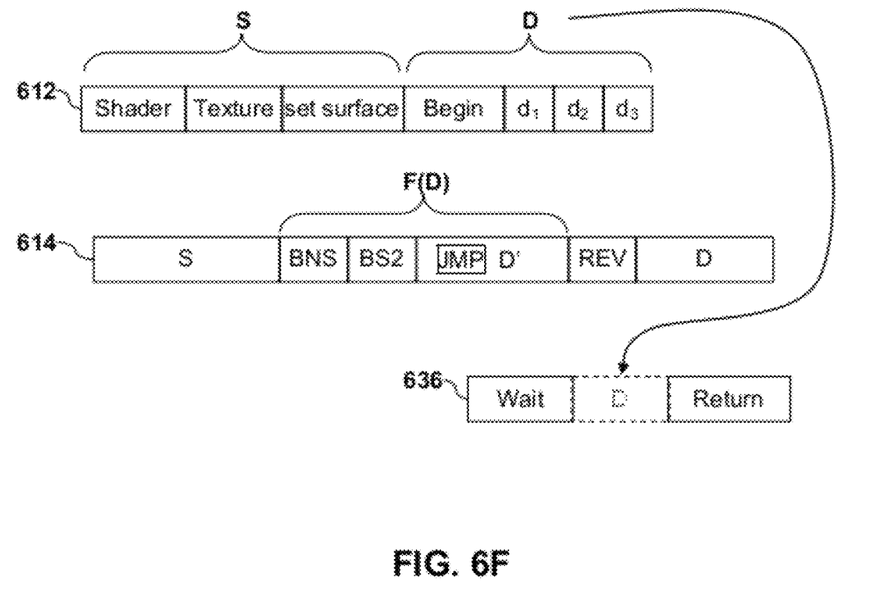
FIG. 6F illustrates an example of implementation of a shader debugger in accordance with an embodiment of the present invention.

In some embodiments, the HUD program 608 may implement a shader debugger. FIG. 6F illustrates an example of an implementation of a shader debugger. In this example, the command buffer 612 contains a state chunk S and a draw call D. The state chunk S may contain a shades command s, a texture command txt, and a set surface command set s. These commands may include pointers to locations in memory where the corresponding shader, texture and surface may be located. The draw call D may be made up of a begin draw command BD, one or more draw commands $d_1$, $d_2$, $d_3$ and an end draw command ED. The HUD program 608 may copy the state chunk S to the push buffer 614 (e.g., using the chunk handler 616) as described above. The HUD program 608 may then insert a shader debug sequence $F(D)$ into the push buffer 614 after the state chunk S and before the draw call D. The shader debug sequence $F(D)$ may involve executing the draw call D twice with the GPU 606. It is noted that use of command buffer 612 and push buffer 614 reduces the amount of information that is kept in memory by the HUD program 608. However, it is not known a priori whether the draw D call will fit in the push buffer 614. To address this, the shader debug sequence $F(D)$ may be implanted as follows. Specifically, the shader debug sequence $F(D)$ may include a bind new shader instruction BNS, a bind surface instruction BS, a placeholder D' for the draw call D and a revert command REV that undoes the BNS and BS commands. The placeholder D' may include a jump instruction JMP that causes the GPU to jump to a wait instruction that causes the GPU to wait until the draw call D has been copied to a memory location 636 reserved for draw call D. Another part of the HUD program 608 executed by the CPU 602 may copy the draw call D from the command buffer 612 to location 636. The GPU 606 then either copies the draw call D to the push buffer 614 or simply executes draw call D from memory location 636 and then returns to execute the revert command REV and execute the draw call D again.

In some embodiments, the HUD program 608 may implement a save algorithm that allows a user to replay one or more frames. The save algorithm recognizes that what is shown on the screen is a function of the commands in the command buffer and the data used by those commands that are stored in memory. To replay a frame, save algorithm needs to store the commands and proper memory configuration associated with that frame. To obtain this information one could halt the GPU 606 after every draw call and read back memory into a large data structure. Unfortunately, a given draw call may need to access data from anywhere within the memory 604. Thus, saving the entire memory for each draw call could require an enormous amount of data storage capacity. For example, the accessible memory associated with a picture may be 256 Megabytes and about 1000 draw calls may be required to draw the picture. This would imply that about 2.5 gigabytes of data would have to be stored in order to replay a single picture. Since not every draw call changes every portion of memory it is desirable to only save those portions that change in order to limit the amount of data that must be saved with each draw call. For example, the memory 604 may be divided up into a plurality of pages. A given draw call might only change one of these pages.

To determine which pages have changed, the HUD program may save the command buffer and save every page for a first draw call and compute a hash for each page of memory 604. The hashes for each page may be stored in a table in memory that is sorted by draw call. Table II illustrates an example of such a table.

TABLE II

| DRAW CALL | PAGE 0 Hash | PAGE 1 Hash | ... | PAGE N Hash |
|---|---|---|---|---|
| 0 | 0 | 1 | ... | ... |
| 1 | 0 | 2 | ... | ... |
| 2 | 0 | 2 | ... | ... |
| 3 | 0 | 2 | ... | ... |
| ... | ... | ... | ... | ... |

In this example, it may be seen from Table II that page 0 did not change for draw calls 1, 2, and 3 but that draw call 1 changed page 1. Thus only page 1 needs to be saved for draw call 2. Since neither page 0 nor page 1 was changed by draw calls 2 and 3 it is not necessary to re-save these pages for these draw calls.

By way of example, such a save algorithm may be implemented by use of a front command inserted before each draw call for which commands and data need to be saved. The front command saves the commands associated with the draw call. Such commands may include both state commands and draw commands. The save algorithm computes a hash function for each page and saves the hash function to a table of the type shown in table II. By way of example, the save algorithm may put a hole after every draw command. The hole may perform a cyclic redundancy check (CRC) of the memory 604 and read it back. By way of example the CRC may compute a checksum every 64 kByte page for each draw call that is executed by the GPU 606 and compare the checksums from one draw call to the next using a data structure similar to Table II. In essence, the save algorithm computes a hash code for every page in memory 604 and, at every subsequent draw call, recomputes the hash code for each page and check to see if any have changed. If a page has been changed it may be saved, e.g., to memory or mass storage, such as a hard drive. In order to replay the frame we make a record (table) saying what the code is for each page at each draw call. Whenever the HUD program 608 sees a page that has been changed by a particular draw call it assigns the page an identifier and saves the page, e.g., to hard drive. The HUD program then notes that that the particular draw call uses the assigned page identifiers. This way when the frame is replayed all the necessary page identifiers may be stored to memory.

To replay the saved pages the command buffer, the memory 604 must contain the saved pages and a page table that associates each draw call with the relevant page numbers and identifies which page needs to be present in memory for that draw call.

Some implementations of the save algorithm may hint the HUD program 608 system as to which pages are in use for each draw call. The save algorithm may compute a worst case estimate of which pages are in use for each draw call and then compute the hash code only for those pages estimated to be used by the draw call. The save algorithm may overestimate the actual use of pages but still reduce number of pages for which a hash code must be calculated. This can reduce the overall CPU processing time associated with the save algorithm By way of example, the hints may be generated automatically by the system by inspecting the tracked state of the GPU 606 with the HUD program 608. From this tracked state the HUD program 608 may generate an estimate of which pages will be consumed by the GPU 606 during the draw call, and then tell the save algorithm to only consider these pages during the CRC operation. Alternatively, the hints may be functions that the programmer of the graphics program 610 can use to tell HUD program 608 that the graphics program is about to use a specific portion of memory, thus explicitly indicating what pages will be used and what will not.

Figure 7:
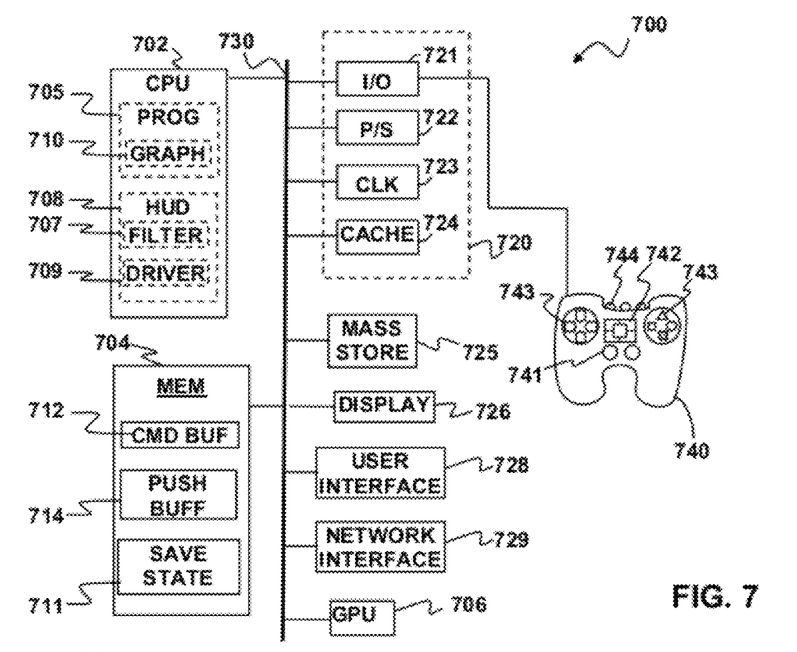
FIG. 7 is a block diagram of a software development apparatus according to an embodiment of the present invention.

As depicted in FIG. 7, a software development apparatus 700 may include a central processor module 702, a memory 704 (e.g., RAM, DRAM, ROM, and the like) and a graphics processor unit 706. In addition, the central processor module 702 may include multiple processors if parallel processing is to be implemented. The central processor module 702 may include a main program 705, a HUD program 708, which may be configured to facilitate software development as described above. The HUD program may include filters 707 and drivers 709, e.g., as described with respect to Table I. The HUD program may be configured to operate in conjunction with a graphics program 710. It is noted that portions of code for the HUD program 708 and graphics program 710 may be stored in memory 704. Specifically, the memory 704 may include a command buffer 712 and a push buffer 714. The memory 704 may also contain a save state table 711 which may be configured as set forth above with respect to Table II.

The apparatus 700 may also include well-known support functions 720, such as input/output (I/O) elements 721, power supplies (P/S) 722, a clock (CLK) 723 and cache 724. As used herein, the term I/O generally refers to any program, operation or device that transfers data to or from the apparatus 700 and to or from a peripheral device. Every data transfer may be regarded as an output from one device and an input into another. Peripheral devices include input-only devices, such as keyboards and mouses, output-only devices, such as printers as well as devices such as a writable CD-ROM that can act as both an input and an output device. The term "peripheral device" includes external devices, such as a mouse, keyboard, printer, monitor, microphone, game controller, camera, external Zip drive or scanner as well as internal devices, such as a CD-ROM drive, CD-R drive or internal modem or other peripheral such as a flash memory reader/writer, hard drive.

The apparatus 700 may optionally include a mass storage device 725 such as a disk drive, CD-ROM drive, tape drive, or the like to store programs and/or data. The apparatus 700 may also optionally include a display unit 726 and user input unit 728 to facilitate interaction between the apparatus 700 and a user. The display unit 726 may be in the form of a cathode ray tube (CRT) or flat panel screen that displays text, numerals, graphical symbols or images. The user interface 728 may include a keyboard, mouse, joystick, light pen or other device. In addition, the user input 728 may include a microphone, video camera or other signal transducing device. The apparatus 700 may also include a network interface 729 to enable the device to communicate with virtual world servers and other similarly configured devices over a network, such as the internet. The central processor module 702, memory 704, graphics processor unit 706, user input 728, network interface 729 and other components of the apparatus 700 may exchange signals (e.g., code instructions and data) with each other via a system bus 730.

In certain embodiments of the invention, the apparatus 700 may include a controller 740 coupled to the processor via the I/O functions 721 either through wires (e.g., a USB cable) or wirelessly, e.g., using infrared or radiofrequency (such as Bluetooth) connections. The controller 740 may have analog joystick controls 741 and conventional buttons 743 that provide control signals commonly used during playing of video games. Such video games may be implemented as processor readable data and/or instructions from the program 705 which may be stored in the memory 704 or other processor readable medium such as one associated with the mass storage device 725. The controller unit 740 may include an inertial sensor 742, and light sources 744.

The central processor module 702 may execute instructions in response to the main program 705, HUD program 708 and graphics program 710 that facilitate software development.

Specifically, these instructions may cause the apparatus 700 to present a graphic display of information as it is normally produced by a process implemented with computer software (e.g., main program 705 and graphics program 710), select an arbitrary range of objects within the graphic display (e.g. as described above with respect to FIG. 1 through FIG. 5C), apply one or more filters to the processing of the objects in the arbitrary range (e.g., as described with respect to Table I), and change the processing of the objects dynamically in response to the filters (e.g., as described with respect to FIG. 6A through FIG. 6C).

Code portions of the main program 705, HUD program 708 and graphics program 710 may conform to any one of a number of different programming languages such as Assembly, C++, JAVA or a number of other languages. The processor module 302 may form a general-purpose computer that becomes a specific purpose computer when executing programs such as the main program 705, HUD program 708 and graphics program 710. Although these programs are described herein as being implemented in software and executed upon a general purpose computer, those skilled in the art will realize that the method of task management could alternatively be implemented using hardware such as an application specific integrated circuit (ASIC) or other hardware circuitry. As such, it should be understood that embodiments of the invention can be implemented, in whole or in part, in software, hardware or some combination of both.

Figure 8:
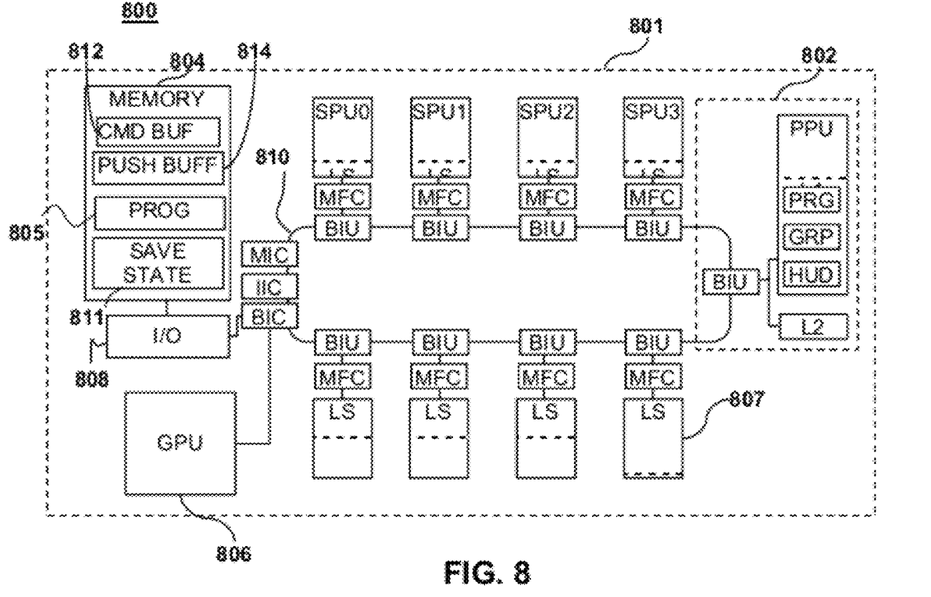
FIG. 8 is a block diagram of a cell processor implementation of a software development apparatus according to an embodiment of the present invention.

As discussed above, embodiments of the present invention may be implemented on parallel processing systems. Such parallel processing systems typically include two or more processor elements that are configured to execute parts of a program in parallel using separate processors. By way of example, and without limitation, FIG. 8 illustrates a type of cell processor based system 800 according to an embodiment of the present invention. The system 800 may use a cell processor 801 as the CPU of FIG. 6A or the central processor module 702 of FIG. 7. In the example depicted in FIG. 8, the cell processor 801 includes a main memory 804, power processor element (PPE) 802, and a number of synergistic processor elements (SPEs) 807. In the example depicted in FIG. 8, the cell processor 801 includes a single PPE 802 and eight SPE 807. In such a configuration, seven of the SPE 807 may be used for parallel processing and one may be reserved as a back-up in case one of the other seven fails. A cell processor may alternatively include multiple groups of PPEs (PPE groups) and multiple groups of SPEs (SPE groups). In such a case, hardware resources can be shared between units within a group. However, the SPEs and PPEs must appear to software as independent elements. As such, embodiments of the present invention are not limited to use with the configuration shown in FIG. 8.

The main memory 804 typically includes both general-purpose and nonvolatile storage, as well as special-purpose hardware registers or arrays used for functions such as system configuration, data-transfer synchronization, memory-mapped I/O, and I/O subsystems. In embodiments of the present invention, a main game program 805 (e.g. a video game program) portions of which may be resident in main memory 804. The video program 805 may include a graphics program which sends commands to a graphics processor unit 806 as described above. The program 805 may be divided up into multiple signal processing tasks that can be executed on the PPE 802 and/or SPEs 807, e.g. as different threads. By way of example, the PPE 802 may be a 64-bit PowerPC Processor Unit (PPU) with an associated internal cache L1 and external cache L2. Instructions for a main program PRG, graphics program GRP and HUD program HUD of the types described above may be temporarily stored in the internal cache L1. The main memory 804 may contain a command buffer 812 and push buffer 814 as well as a save state table 811 as described above. The PPE 802 is a general-purpose processing unit, which can access system management resources (such as the memory-protection tables, for example). Hardware resources may be mapped explicitly to a real address space as seen by the PPE. Therefore, the PPE can address any of these resources directly by using an appropriate effective address value. A primary function of the PPE 802 is the management and allocation of tasks for the SPEs 807 in the cell processor 801.

Although only a single PPE is shown in FIG. 8, some cell processor implementations, such as cell broadband engine architecture (CBEA), the cell processor 801 may have multiple PPEs organized into PPE groups, of which there may be more than one. These PPE groups may share access to the main memory 804. Furthermore the cell processor 801 may include two or more groups SPEs. The SPE groups may also share access to the main memory 804. Such configurations are within the scope of the present invention.

Each SPE 807 is includes a synergistic processor unit (SPU) and its own local storage area LS. The local storage LS may include one or more separate areas of memory storage, each one associated with a specific SPU. Each SPU may be configured to only execute instructions (including data load and data store operations) from within its own associated local storage domain. In such a configuration, data transfers between the local storage LS and elsewhere in the system 800 may be performed by issuing direct memory access (DMA) commands from the memory flow controller (MFC) to transfer data to or from the local storage domain (of the individual SPE). The SPUs are less complex computational units than the PPE 802 in that they do not perform any system management functions. The SPU generally have a single instruction, multiple data (SIMD) capability and typically process data and initiate any required data transfers (subject to access properties set up by the PPE) in order to perform their allocated tasks. The purpose of the SPU is to enable applications that require a higher computational unit density and can effectively use the provided instruction set. Managing a significant number of SPEs 807 with the PPE 802 allows for cost-effective processing over a wide range of applications.

Each SPE 807 may include a dedicated memory flow controller (MFC) that includes an associated memory management unit that can hold and process memory-protection and access-permission information. The MFC provides the primary method for data transfer, protection, and synchronization between main storage of the cell processor and the local storage of an SPE. An MFC command describes the transfer to be performed. Commands for transferring data are sometimes referred to as MFC direct memory access (DMA) commands (or MFC DMA commands).

Each MFC may support multiple DMA transfers at the same time and can maintain and process multiple MFC commands. Each MFC DMA data transfer command request may involve both a local storage address (LSA) and an effective address (EA). The local storage address may directly address only the local storage area of its associated SPE. The effective address may have a more general application, e.g., it may be able to reference main storage, including all the SPE local storage areas, if they are aliased into the real address space. To facilitate communication between the SPEs 807 and/or between the SPEs 807 and the PPE 802, the SPEs 807 and PPE 802 may include signal notification registers that are tied to signaling events. The PPE 802 and SPEs 807 may be coupled by a star topology in which the PPE 807 acts as a router to transmit messages to the SPEs 807. Alternatively, each SPE 807 and the PPE 802 may have a one-way signal notification register referred to as a mailbox. The mailbox can be used by an SPE 807 to host operating system (OS) synchronization.

The cell processor 801 may include an input/output (I/O) function 808 through which the cell processor 801 may interface with peripheral devices, such as a microphone array and optional image capture unit and a game/virtual world controller. The controller unit may include an inertial sensor, and light sources. In addition an Element Interconnect Bus 810 may connect the various components listed above. Each SPE and the PPE can access the bus 810 through a bus interface units BIU. The cell processor 801 may also includes two controllers typically found in a processor: a Memory Interface Controller MIC that controls the flow of data between the bus 810 and the main memory 804, and a Bus Interface Controller BIC, which controls the flow of data between the I/O 808 and the bus 810. In the system 800, the GPU 806 may be coupled to the cell processor 801 via the BIC. Although the requirements for the MIC, BIC, BIUs and bus 810 may vary widely for different implementations, those of skill in the art will be familiar their functions and circuits for implementing them.

The cell processor 801 may also include an internal interrupt controller IIC. The IIC component manages the priority of the interrupts presented to the PPE. The IIC allows interrupts from the other components the system 800 to be handled without using a main system interrupt controller. The IIC may be regarded as a second level controller. The main system interrupt controller may handle interrupts originating external to the cell processor.

In embodiments of the present invention, certain computations that facilitate interaction with the virtual world, may be performed in parallel using the PPE 802 and/or one or more of the SPE 807. Such computations may be run as one or more separate tasks that different SPE 807 may take as they become available.

Embodiments of the invention are simple in design, allow for rapid development cycles and are, easy to use. In addition, embodiments of the invention are more intuitive from an artist's point of view and are therefore particularly suitable for computer graphics developers.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for analysis of graphics software, wherein a graphics program places commands in a command buffer for a graphics processor unit (GPU), the method comprising:
   copying a program chunk from the command buffer to a push buffer, wherein the program chunk contains successive commands that are all of a common type;
   handling the program chunk through command buffer and/or push buffer manipulation that is transparent to the graphics program; and
   executing the program chunk from the push buffer with the graphics processor.

2. The method of claim 1 wherein handling the program chunk comprises:
   a) inserting a front command immediately before the program chunk in the push buffer, wherein the front command changes the operation of the program chunk in a way that facilitates analysis of the graphics program;
   b) moving a get to a point before a beginning of the front command in the push buffer;
   c) inserting a back command immediately after the program chunk, wherein the back command is configured to revert a configuration of the program to a configuration it would have had without the front command;
   d) moving a put in the push buffer to a point after an end of the back command.

3. The method of claim 2, further comprising:
   e) placing time stamps immediately before and after the program chunk.

4. The method of claim 2, further comprising determining a time utilized by the graphics processor in executing the front and back commands using the time stamps and subtracting the time when computing timing of processing of the program chunk with the graphics processor.

5. The method of claim 2 wherein executing the program chunk comprises executing the front command, the program chunk and the back command from the push buffer with the graphics processor.

6. The method of claim 2 wherein the front command and/or back command implements a function on the program chunk.

7. The method of claim 2, further comprising implementing a function on a source of the program chunk, wherein the function facilitates analysis of the graphics program.

8. The method of claim 2, wherein the front command and/or back command implements a function on the program chunk, wherein the function requires information from a memory that is not yet available when the front or back command is put in the push buffer, the method further comprising;
   a) preventing execution of the front command, program chunk or back command until the information is available;

b) importing the information to the function once the information becomes available; and
c) subsequently permitting execution of the front command, program chunk or back command.

9. The method of claim 8 wherein the function is part of a vertex driver, shader debug driver, shader defrag disassembly driver filter or driver that asks for data that was in memory at a time of a draw call.

10. The method of claim 2, wherein the program chunk comprises one or more commands that set a state associated with a subsequent draw command.

11. The method of claim 10 wherein the front command modifies the state from an initial value and the back command reverts the state to the initial value.

12. The method of claim 1 wherein handling the program chunk comprises implementing a function on a source of the program chunk, wherein the function facilitates analysis of the graphics program.

13. The method of claim 12, further comprising, determining a processing time on the graphics processor associated with handling of the program chunk and subtracting the processing time when computing timing of processing the program chunk with the graphics processor.

14. The method of claim 1 wherein handling the program chunk comprises applying one or more filters to the program chunk.

15. The method of claim 14 wherein the one or more filters are chosen from the group of a Simple Shader, a 1×1 Viewport, a Register Count, a Disable Render, a Reduce Geometry, a Disable ZCULL, a 1×1 Textures and a Wait For Idle filter.

16. The method of claim 1, handling the program chunk includes saving frame data associated with a frame drawn by the GPU.

17. The method of claim 16 wherein saving frame data comprises:
saving a set of commands associated with drawing a frame;
a) saving an initial set of frame data for an initial draw call, wherein the frame data is made up of two or more portions;
b) determining for a subsequent draw which, if any, of the two more portions has been changed by the subsequent draw call; and
c) saving those portions which have been changed by the subsequent draw call.

18. The method of claim 17 wherein b) comprises computing an initial hash function for each of the two or more portions of the initial frame data; computing a subsequent hash function for one or more of the portions after the subsequent draw call; and comparing the initial and subsequent hash functions.

19. The method of claim 18 wherein b) further comprises estimating whether one or more portions are used by the subsequent draw call; and hashing a given portion only if it is estimated that the given portion has been used by the subsequent draw call.

20. The method of claim 1 wherein handling the program chunk includes implementing a shader debugger.

21. The method of claim 20 implementing a shader debugger comprises inserting a shader debug sequence F(D) into the push buffer between a state chunk S and a draw call D, wherein the debug sequence includes placeholder D' for the draw call D, a state modifier portion that modifies the state from a state defined by the state chunk S, and a revert instruction REV that reverts state to that associated with the state chunk S.

22. The method of claim 21 wherein the placeholder D' includes a jump instruction JMP that causes the GPU to jump to a wait instruction that causes the GPU to wait until the draw call D has been copied to a memory location reserved for draw call D.

23. The method of claim 22, further comprising copying the draw call D from the command buffer to the memory location reserved for the draw call D and either (a) copying the draw call D to the push buffer or (b) executing draw call D from the memory location with the GPU; revert command REV to revert a state and execute the draw call D again from the push buffer with the GPU.

24. The method of claim 23 wherein the state modifier portion comprises a bind new shader instruction BNS, a bind surface instruction BS, a placeholder D' for the draw call D and wherein the revert command REV is configured to undo the BNS and BS commands.

25. The method of claim 1, wherein the handling the program chunk involves modifying the program chunk before the program chunk is executed with the graphics processor from the push buffer.

26. The method of claim 1, further comprising implementing a function on a source of the program chunk, wherein the function facilitates analysis of the graphics program, and wherein the handling the program chunk involves modifying the program chunk before the program chunk is executed with the graphics processor from the push buffer.

* * * * *